INVENTORS
Donald C. Rideout
Luke M. Shuler &
William H. Riley, Jr.

BY Karl W. Flocks

ATTORNEY

3,496,006
METHOD OF PRODUCING REFLECTIVE MARKER
Donald C. Rideout and Luke M. Shuler, Huntingdon, and William H. Riley, Jr., Altoona, Pa., assignors to Prismo Safety Corporation, Huntingdon, Pa., a corporation of Pennsylvania
Filed Dec. 2, 1966, Ser. No. 598,717
Int. Cl. C03c *17/32;* B44d *1/46*
U.S. Cl. 117—45                                5 Claims

ABSTRACT OF THE DISCLOSURE

Provides a transparent top coating onto a partially exposed glass sphere marker to obtain a coating on each sphere that is thicker at the center of the exposed portion of the sphere than at the sides thereof by air spraying a composition onto the marker comprising less than 20% resin plus 80% or more of a solvent having an effective relative evaporation rate of at least 145, the air spraying being conducted at a relatively high air to fluid ratio and drying by heating.

---

This invention relates to reflective signs and markers and more particularly to reflective signs and markers that are resistant to the elements and give greater reflectivity, and to the methods and compositions for making them.

Most reflective signs are of the exposed lens type. The exposed lens type signs are usually made by dropping glass spheres onto a tacky pigmented binder layer and permitting the binder layer to cure. The glass spheres may be reflectively coated with a reflective metal and after curing of the binder layer, the exposed reflective metal coating is removed leaving the reflective coating only on the underside or embedded side of the glass spheres. These signs are relatively inexpensive, give good night time reflection, can be made with a minimum of equipment by the user and can be applied to irregular as well as flat surfaces. This type of sign has a number of disadvantages, however. For example, the sign has poor water resistance, tend to pick up and retain dirt particles, has poor color characteristics, both daytime and nighttime, and is highly susceptible to weathering. Further, the exposed surface of the reflective metal tends to react with the elements present in the atmosphere to darken thereby causing an objectionable daytime darkening of the sign and eventually affecting the nighttime reflectivity.

These disadvantages can be at least partially eliminated by providing a protective coating applied over the entire surface of the reflector in such a manner that a heavy coating accumulates in the interstices between the glass spheres thereby giving the maximum protection to the exposed surface of the reflective metal surrounding each bead without substantially altering the retro reflective properties of the sign. The coating composition is selected and applied in such a manner that the coating tends to flow downwardly from the upper surfaces of the spheres accumulating in the valleys between the spheres and leaving little or no coating on the upper surface of the spheres. This results in practically no increase in the radius of the spheres and thereby causes no diminution in the effective refractive index of the spheres irrespective of the refractive index of the coating.

Compositions and the method of applying such compositions are described in our copending application Ser. No. 598,629, filed Dec. 2, 1966.

When it is desired to apply retro reflecting messages of one or more colors onto such a sign blank, many problems were found to exist. First of all, when spraying the colored compositions onto the sign blank, masking techniques were required which became quite expensive due to the large amount of time and handling required, the one time use of each mask, and the danger of lifting of any portion of the mask during the spraying operation causing an imperfect sign.

The use of silk screen techniques substantially reduces the above disadvantages, however, until the present invention there have been no screening inks available which can be applied onto an exposed lens sign. The screening inks available are only satisfactory for use on flat smooth front surfaces since their flow characteristics would cause them to flow for the most part off the exposed glass sphere surfaces resulting in a fair daylight color but poor retro reflected color. Thus, existing screen inks are not satisfactory for this function.

Further, when the color to be applied is one with low tinting strength such as red, green and blue for example, the pigmentation must be increased to such an extent to obtain the desired intensity of color that the resulting colored coating does not have the required glossy optical surface necessary for retro reflection, but instead, a light diffusing surface results. Thus, a further uniform coat of a clear or pigmented resin is required to develop the required smooth surface. The resulting thickness of such dual coatings often has been found to seriously affect the retro reflectivity of the glass spheres.

It is accordingly an object of the present invention to provide novel compositions of screening inks which can be applied onto exposed lens type signs by conventional silk screen techniques.

It is a further object of the present invention to provide compositions and a method of applying such compositions to form a top coat onto a colored or uncoated reflective exposed lens type sign to increase the effective refractive index of the glass spheres therein.

These and other objects and the nature and advantages of the instant invention will be apparent from the following description taken in conjunction with the accompanying drawings, wherein.

Figure 1:
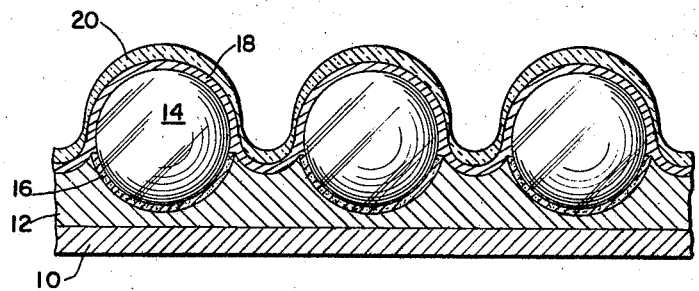
FIG. 1 is a diagrammatic elarged view of a portion of a sign showing the glass spheres provided with a uniform thickness colored coating and a lens like top coating.

According to the present invention it has been found that the effective index of refraction of a glass sphere whether coated with a transparent coating or not can be increased by application of a top coating on each glass sphere which is in the form of a lens of transparent material. The invention contemplates the compositions of material and methods of application so as to obtain such a lens-like coating on each sphere.

Exposed lens type reflectors comprise in general a backing sheet which may be of wood, metal or the like having a layer of pigmented binder thereon in which a plurality of small glass spheres are partially embedded. The binder layer may be white or colored and the daylight color from the binder is primarily reflected from the interstices between the glass spheres. The night time reflected light reflects from the reflective binder beneath the spheres or from the reflective metal coating on the embedded portion of the glass spheres.

In such reflectors glass spheres with a refractive index in the range of 1.90–1.95 have been found preferable both for the reflective metal coated and uncoated spheres. The non-reflectively coated spheres may, however, be glass spheres having a refractive index in the range of 1.5–1.7. The preferred size of the glass spheres is in the range of 0.0058–0.0065 inch average diameter, the spheres being screen graded if necessary so as to avoid an undue variation in size. The spheres may be slightly smaller or larger than this, but best results and uniformity of appearance are realized when using spheres of relatively uniform size not varying by more than 1 mil in diameter.

For certain purposes, a mixture of reflective metal coated and uncoated glass spheres may be utilized in the marker. When such a mixture of glass spheres is used in a colored reflective sign, the proportion of the reflective metal coated spheres can be varied between 25–100% and the uncoated spheres between 0–75%. For daylight appearance in a colored sign it doesn't matter which type of spheres are utilized, however, at night, best reflectance is obtained when at least 25% of the spheres are metal coated, although excellent results are obtained when 25–100% of the spheres are metal coated. For a white sign, which utilizes a clear unpigmented protective coating, at least 25% of the uncoated spheres are used for best daylight appearance and at least 25% of the metal coated spheres are used for best night time reflection. Thus, for both good daylight and night time appearance, in a white sign the proportion of metal coated spheres is maintained between 25–75% and the proportion of clear spheres is maintained between 25–75%.

The mixture of reflectively coated and uncoated spheres can be applied to a pigmented binder while it is still tacky. After the binder has set up and hardened, the spheres are retained partially embedded therein. The exposed reflective coating on the spheres is next removed by washing with nitric acid or other solvent therefor, or by use of abrasive, etc. to yield reflectively backed spheres along with the uncoated spheres.

The reflector is now ready for application of a colored transparent coating over portions of the surface thereof to apply a message utilizing silk screen techniques with printing inks in accordance with this invention.

It is essential that the flow characteristics of screening inks used on exposed lens type signs be such that a thin uniform colored coating is obtained having a constant thickness on both the glass spheres as well as in the interstices between the glass spheres. Some of the required characteristics of a satisfactory screening ink for the present use are as follows:

(1) The ink must have a sufficiently high viscosity for good screening characteristics.

(2) The ink must have a very low percentage by volume of solids such that when dried a uniform thin layer is left on the lenticular surface; it does not materially alter the point of focus.

(3) This thin dried layer must have sufficient transparent pigment to give the desired reflected color.

(4) Once deposited, the ink must not flow such that the deposited film varies in thickness on the area of the spherical surface which affects retro reflectivity.

(5) The freshly deposited ink must fill the voids between the spheres such that no contrasting background can be seen.

(6) The ink must have sufficient flow so that the material will not hang up on the coater bar.

(7) The ink must not dry out or change its rheological character on the screen with constant or intermittent operation of the equipment.

(8) The ink must be light-fast and durable when dried.

(9) The ink must be able to be quickly dried at oven temperatures or air dried without changing its characteristics.

It has been found that it is not possible to fulfill all of the above requriements with all the suitable transparent colored pigments. Those pigments which require a high volume within the film to achieve the desired retro reflective color result in a layer which does materially alter the point of focus. This causes the theoretical point of focus to be outside of the sphere, thereby reducing its maximum retro reflective intensity. It has been discovered that it is possible, however, through a very critical balance of solvent selection, solids, and spray technique to apply a top coating which in effect forms a transparent colorless organic lens on top of each sphere which refocuses the major amount of the impinging light on the glass-metal interface of the sphere thereby developing the maximum retro reflective character.

The organic lens referred to above which is formed on each sphere is a coating which is thicker in front of the center of the sphere than it is toward the edges, resulting in an increase in the effective refractive index of the optical system counteracting the reduction in effective index caused by the presence of an appreciable thickness in the front coating on the sphere, and preserving or increasing the effective refractive index of the uncoated optical system. This geometrical shape allows a practically useful thickness of coating material to be applied to be more effectively protective and/or more effectively colored, without loss of the desirable optical characteristic of bright reflection at small divergence angles. In addition, it makes possible the use of glass spheres of lower refractive index without losing the optical performance characteristic of uncoated spheres of higher index of refraction.

The principle of a convex-lens-like front coating on the glass spheres as well as the method of applying it are a portion of the subject of this invention. It should be understood, however, that any method which results in such a convex-lens-like front coating on the exposed surfaces of the spheres of a sign will accomplish the purpose of this invention.

The screening inks which have been found suitable for applying a thin uniform coating on exposed lens type signs using silk screen techniques have the following general formulation:

| | Percent by weight |
|---|---|
| Resin | 0.7–32 |
| Thixotrope | 4–12 |
| Dye or pigment | 1–15 |
| Solvent | 58–92 |
| Additives (wetting agents, stabilizers, plasticizers, etc.) | 0–7 |

These screening inks are applied at a coverage rate of 400 sq. ft./gal. at an average wet film thickness of 4.0–4.2 mils. The wet sign is then dried for 10 minutes at 300° F. During the drying period a typical screened film shrinks from 4.0–4.2 mils to approximately 0.32 mil.

These new screening inks have extremely critical requirements in order to develop maximum retro reflective properties. They must be highly thixotropic at low solids volume level. They must rapidly lose viscosity at the shearing stress used with standard screening equipment. These inks in addition must rapidly regain viscosity so that the inks do not flow from the top of the glass sphere, but rather the film shrinks completely enclosing the spheres during drying. This is completely contrary to the normal behavior of conventional screen inks which are designed to flow to a smooth flat surface under these conditions.

The screening inks according to the present invention have viscosities from 10,000–100,000 cps. The viscosity is determined by shaking the inks until no further drop in viscosity is noted and the viscosities are determined by the use of a Brookfield high viscosity viscometer.

The resins which may be used in the screening inks are those commonly used for outdoor exposure. Examples are acrylic alkyd esters, polyvinyl chloride-acetate copolymers, cellulose acetate-butyrate and alkyd-melamine. Since the screening ink coating in the sign is to be top coated by a resin which has excellent stability to ultra violet light and good weathering properties, the choice of resin used is not critical. The prime functions of the resin in the screen ink are to maintain the dispersion of the pigments in the system, to bind the pigment to the substrate, and to prevent the displacement of the pigment upon application of the top coating.

The thixotrope utilized should form strong gels with the solvent, break down rapidly with stress, recover quickly, and maintain the viscosity and flow resistance at elevated temperatures. The preferred thixotrope is an amine treated bentonitic clay, for example, dimethyl dioctadecyl ammonium bentonite. However, other organic derivatives of magnesium montmorillonite are satisfactory. Somewhat less satisfactory are hydrogenated high molecular weight castor oil, metal soaps and colloidal silicas. Vinyl chloride-vinyl acetate copolymers also act as thixotropes. A small percentage of about 2–5% ethanol is used in conjunction with amine treated bentonitic clay to cause the clay to swell. In the following examples, the ethanol is considered to be a portion of the additives rather than a portion of the solvents used.

The pigments or dyes used should be light-fast, stable to heat, and highly transparent.

The solvent used should have a very slow evaporation rate to prevent drying out in the screen and should be of such a nature that it will allow the formation of a highly thixotropic body with the thixotrope used. Solvents which may be used are those having a relative evaporation rate less than 30. Combinations of solvents may be used if the major proportion thereof has a relative evaporation rate less than 30. The relative evaporation rate is determined by direct comparison with butyl acetate with the evaporation time of butyl acetate rated as 100.

The following is a list of solvents which have evaporation rates less than 30:

| Solvent | Rate |
|---|---|
| Butyl carbitol | <1 |
| Butyl carbitol acetate | <1 |
| Butyl cellosolve | 6 |
| Butyl cellosolve acetate | 3 |
| Butyl lactate | 3 |
| Carbitol acetate | <1 |
| Ethyl lactate | 22 |
| Isophorone | 3 |
| Methyl carbitol | <1 |
| Primary amyl alcohol | 26 |
| Ethyl amyl ketone | 25 |
| Cellosolve acetate | 21 |
| Cyclohexanone | 23 |
| Diacetone alcohol | 14 |
| Diethyl carbitol | 4 |
| Diisobutyl ketone | 18 |
| 2-ethylhexyl acetate | 3 |
| Cyclohexanol | 8 |
| 1-hexanol | 5 |
| Aromatic solvent (97%) (IBP 311° F. dry point 344° F.) (Solvesso 150) | <10 |
|     C9 aromatics __percent__ | 1.2 |
|     C10 aromatics __do__ | 54.3 |
|     C11 aromatics __do__ | 18.5 |
|     C12 aromatics __do__ | 1.8 |
|     Indenes __do__ | 16.0 |
|     Naphthalenes __do__ | 5.2 |
|     Non-aromatics __do__ | 3.0 |

Following are non-limiting examples of formulations which can be used as transparent colored screening inks for use on exposed lens type signs.

Example 1

| | Percent by weight |
|---|---|
| Methylmethacrylate-ethylacrylate copolymer | 2.0 |
| Solvesso 150 | 82.0 |
| Dimethyl dioctadecyl ammonium bentonite | 9.5 |
| Halogenated pyranthrone pigment toner (C.I. No. 59710) | 2.7 |
| Ethanol | 3.8 |

This formulation yielded a red coating, had a viscosity of approximately 35,000 cps. and a total solids content of 14.2%.

Example 2

| | Percent by weight |
|---|---|
| Methyl methacrylate-ethylacrylate copolymer | 2.0 |
| Solvesso 150 | 83.8 |
| Dimethyl dioctadecyl ammonium bentonite | 8.0 |
| Beta modification of copper phthalocyanine blue pigment | 3.0 |
| Ethanol | 3.2 |

This blue formulation had a viscosity of approximately 30,000–35,000 cps. and a total solids content of 13%.

Example 3

| | Percent by weight |
|---|---|
| Methyl methacrylate-ethylacrylate copolymer | 2.5 |
| Solvesso 150 | 82.3 |
| Ethanol | 3.2 |
| Dimethyl dioctadecyl ammonium bentonite | 8.0 |
| Phthalocyanine green toner | 4.0 |

This green formulation had a total solids content of 14.5%.

Example 4

| | Percent by weight |
|---|---|
| Methyl methacrylate-ethylacrylate copolymer | 1.7 |
| Solvesso 150 | 83.8 |
| Dimethyl dioctadecyl ammonium bentonite | 8.8 |
| Benzidine yellow pigment | 1.7 |
| Ethanol | 4.0 |

This yellow formulation had a total solids content of 12.2%.

Example 5

| | Percent by weight |
|---|---|
| Methyl methacrylate-ethylacrylate copolymer | 1.6 |
| Solvesso 150 | 86.6 |
| Red dye (halogenated pyranthrone pigment toner) | 2.5 |
| Dimethyl dioctadecyl ammonium bentonite | 6.4 |
| Ethanol | 2.9 |

The solids content was 10.5% by weight.

Example 6

| | Percent by weight |
|---|---|
| Methyl methacrylate-ethylacrylate copolymer | 0.7 |
| Red dye (halogenated pyranthrone pigment toner) | 1.0 |
| Dimethyl dioctadecyl ammonium bentonite | 11.0 |
| Ethanol | 4.9 |
| Solvesso 150 | 82.4 |

This red formulation had a total solids content of 12.7% by weight.

Example 7

| | Percent by weight |
|---|---|
| Methyl methacrylate-ethylacrylate copolymer | 32.0 |
| Phthalocyanine green dye | 2.0 |
| Dimethyl dioctadecyl ammonium bentonite | 6.8 |
| Solvesso 150 | 56.2 |
| Ethanol | 3.0 |

This green formulation had a total solids content of 40.8% by weight.

Example 8

| | Percent by weight |
|---|---|
| Aryl sulfonamide-formaldehyde copolymer | 4.4 |
| 87% vinyl chloride, 13% vinyl acetate copolymer | 12.0 |
| Double scarlet toner R–6430 (C.I. No. 59710) | 9.0 |
| Plasticizer | 0.3 |
| Isophorone | 31.4 |
| Ethyl amyl ketone | 42.8 |
| Stabilizer (sodium-organo-phosphate) | 0.1 |

The vinyl resin acted as the thixotrope. The solids content was 25.8%.

After the screening ink has been applied to the sign blank and the wet sign has been dried for approximately 10 minutes at 300° F., the sign blank is ready for the protective coating.

Referring to the drawings, the sign base is designated 10 and the opaque binder layer is designated 12. Glass spheres 14 are partially embedded in the binder layer 12. The glass spheres 14 may have a metallic coating 16 thereon covering the embedded portion of the sphere. The colored transparent screened coating 18 is applied over the desired portions of the sign in accordance with the present invention, and the transparent coating 20 is then applied to obtain the lens effect in accordance with this invention.

Figure 2:
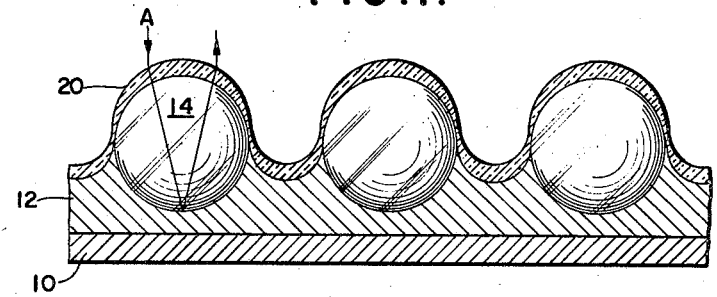
FIG. 2 is a diagrammatic enlarged view of a portion of a sign showing glass spheres of relatively low index of refraction coated with a lens like top coating.

FIG. 2 shows a sign base 10, an opaque reflecting binder layer 12 with glass spheres 14 of relatively low index of refraction partially embedded in the binder. The transparent coating 20 with the lens effect is applied directly onto the glass spheres and the remainder of the sign. As shown, a light ray A is reflected from the intersection of the glass sphere and the reflecting binder.

Figure 3:
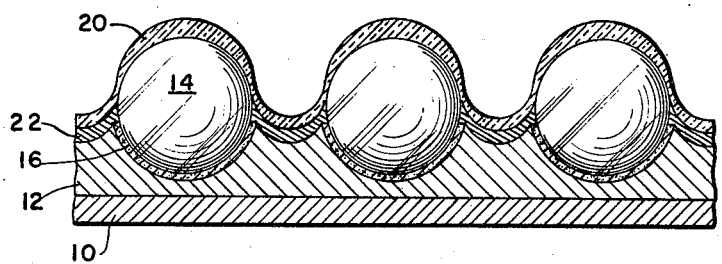
FIG. 3 is a similar view showing a protective coating between the glass spheres with a lens like top coating on the spheres.

In FIG. 3 is shown a sign having the base 10, binder 12, and glass spheres 14 partially embedded in the binder with a metallic coating 16 covering the embedded portion of the sphere. A protective top coat 22 is first applied onto the sign. The top coat 22 is so constituted that when applied to the sign it flows away from the tops of the spheres and collects in the valleys between the spheres protecting the exposed surface of metallic coating 16 from the elements. A final top coat 20 according to the present invention is finally applied to the sign to yield the lens effect on the tops of the beads.

Figure 4:
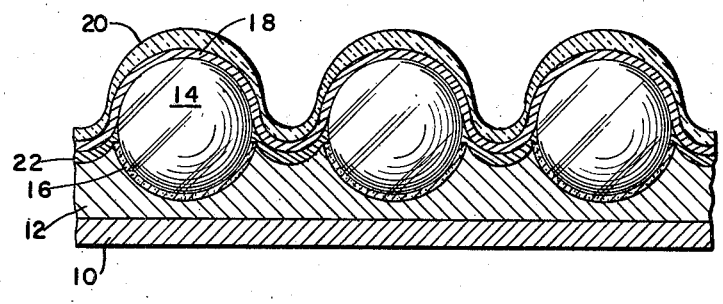
FIG. 4 is a similar view showing a protective coating between the glass spheres; with spheres each provided with a uniform thickness colored coating and a lens like top coating.

The sign of FIG. 4 is similar to that shown in FIG. 3 except that a uniform thickness coating 18 of transparent colored material is screened onto the sign before the final top coat 20 is applied.

The lens effect is effected by the deposition of small particles or droplets of the coating material as a spray upon the front sides of the spheres so that the deposition remains where it hits the sign so as to be heaviest on the front and less heavy on the sides of the spheres similar to a snow cap of wet snow accumulating on top of a post. To obtain this effect, it is necessary to use a good solvent for the resin but one that has a rather rapid evaporation rate. The mechanism is to have the major amount of the solvent evaporate before contacting the sign surface so that at this point the resin is of small particle size with high viscosity. These very fine particles accumulate on top of the spheres similar to wet snow accumulating on top of fence posts. Sufficient solvent must be retained so that when the system is heated and dried, the accumulated resin will fuse into a continuous mass with a smooth surface.

The general formula for the top coating is:

| | Percent |
|---|---|
| Solid resin | 0.25–20 |
| Solvent | 80–99.75 |

The resins that can be used can be any resins or combinations of a group which are commonly used for coating substrates that are to have exterior exposure. Examples are:

alkyd resins
acrylic esters
polyvinyl chloride
polyvinyl chloride-acetate copolymers
cellulose acetate butyrate
alkyd-melamine
polysiloxane
urea-formaldehyde
melamine formaldehyde One critical feature of the invention is to obtain the proper flow characteristics of the composition. It has now been discovered that this can be accomplished by the use of a solvent or combination of solvents which results in a relative evaporation rate of at least 145. The relative evaporation rate is determined by direct comparison with butyl acetate with the evaporation time of butyl acetate rated as 100.

The following is a list of solvents which have evaporation rates of at least 145:

| | |
|---|---|
| Acetone | 1160 |
| 2-butyl acetate | 186 |
| Ethyl acetate (85–90%) | 615 |
| Ethyl ether | 3300 |
| Isobutyl acetate | 145 |
| Isopropyl acetate | 500 |
| Isopropyl ether | 842 |
| Methanol | 610 |
| Methyl acetate (82%) | 1180 |
| Benzene | 630 |
| Toluene | 240 |
| Methyl acetone | 1050 |
| Methyl ethyl ketone | 570 |
| Methyl isobutyl ketone | 165 |
| Methyl propyl ketone | 250 |
| Propyl acetate | 275 |
| Tetrahydrofuran | 800 |
| Ethanol (95%) | 230 |
| Isopropanol | 230 |

Of course, combinations of these solvents and/or other solvents can be used as long as the resulting composition has an effective evaporation rate of at least 145, so that the major amount of the solvent, approximately 80–85% thereof, evaporates before contacting the sign surface. When a combination of solvents is used it is preferable to use:

| | Percent |
|---|---|
| Solvents with relative evaporation rate at least 145 | 75–100 |
| Solvents with relative evaporation rate up to 70 | 0–25 |

The solvent used must be a good solvent for the resin combination used.

The following are solvents having evaporation rates up to 70 that may be used in combination with the above solvents:

| | |
|---|---|
| Ethyl butyl ketone | 45 |
| Methyl amyl acetate | 47 |
| Xylene | 70 |
| Methyl cellosolve | 47 |
| Methyl isoamyl ketone | 45 |
| Methoxy propanol mixed isomer | 50 |
| Butanol | 45 |
| Amyl acetate | 42 |
| Butyl carbitol | <1 |
| Butyl carbitol acetate | <1 |
| Butyl cellosolve | 6 |
| Butyl cellosolve acetate | 3 |
| Butyl lactate | 3 |
| Carbitol acetate | <1 |
| Ethyl lactate | 22 |

| | |
|---|---|
| Isophorone | 3 |
| Methyl carbitol | <1 |
| Methyl cellosolve acetate | 31 |
| Primary amyl alcohol | 26 |
| Ethyl amyl ketone | 25 |
| Cellosolve acetate | 21 |
| Cyclohexanone | 23 |
| Diacetone alcohol | 14 |
| Diethyl carbitol | 4 |
| Diisobutyl ketone | 18 |
| 2-ethyl hexyl acetate | 3 |
| Cyclohexanol | 8 |
| 1-hexanol | 5 |
| Methyl amyl alcohol | 33 |
| Aromatic solvent (97%) (IBP 311° F. dry point 344° F.) (Solvesso 150) | <10 |
|    C9 aromatics _____ percent__ | 1.2 |
|    C10 aromatics _____ do____ | 54.3 |
|    C11 aromatics _____ do____ | 18.5 |
|    C12 aromatics _____ do____ | 1.8 |
|    Indenes _____ do____ | 16.0 |
|    Naphthalenes _____ do____ | 5.2 |
|    Non-aromatics _____ do____ | 3.0 |

The following are non-limiting examples of formulations which can be used as the transparent top coating.

Example A

| | Percent by weight |
|---|---|
| Methyl methacrylate-ethyl acrylate copolymer | 5.5 |
| Urea-formaldehyde resin | 0.8 |
| Vinyl chloride-vinyl acetate copolymer | 1.2 |
| Xylene | 20.0 |
| Methyl isobutyl ketone | 72.5 |

Example B

| | Percent by weight |
|---|---|
| 80% methyl methacrylate-20% ethyl acrylate copolymer | 15.5 |
| Urea-formaldehyde resin | 2.0 |
| Polysiloxane resin | 2.5 |
| Isophorone | 2.0 |
| Methyl ethyl ketone | 78.0 |

Example C

| | Percent by weight |
|---|---|
| 80% methyl methacrylate-20% ethyl acrylate copolymer | 6.4 |
| Urea-formaldehyde resin | 0.7 |
| Polysiloxane resin | 0.9 |
| Methyl isobutyl ketone | 92.0 |

Example D

| | Percent by weight |
|---|---|
| 80% methyl methacrylate-20% ethyl acrylate copolymer | 3.2 |
| Urea-formaldehyde resin | 0.4 |
| Polysiloxane resin | 0.7 |
| Methyl isobutyl ketone | 95.7 |

Example E

| | Percent by weight |
|---|---|
| 80% methyl methacrylate-20% ethyl acrylate copolymer | 6.4 |
| Urea-formaldehyde resin | 0.7 |
| Polysiloxane resin | 0.9 |
| Methyl ethyl ketone | 81.8 |
| Butyl cellosolve | 10.2 |

Example F

| | Percent by weight |
|---|---|
| 80% methyl methacrylate-20% ethyl acrylate copolymer | 6.4 |
| Urea-formaldehyde resin | 0.7 |
| Methyl ethyl ketone | 82.6 |
| Butyl cellosolve | 10.3 |

Example G

| | Percent by weight |
|---|---|
| 80% methyl methacrylate-20% ethyl acrylate copolymer | 6.3 |
| Urea-formaldehyde resin | 0.7 |
| Methyl isobutyl ketone | 44.4 |
| Toluol | 48.6 |

Example H

| | Percent by weight |
|---|---|
| 80% methyl methacrylate-20% ethyl acrylate copolymer | 6.1 |
| Urea-formaldehyde resin | 0.7 |
| Toluol | 88.5 |
| Ethyl amyl ketone | 4.7 |

Example I

| | Percent by weight |
|---|---|
| 80% methyl methacrylate-20% ethyl acrylate copolymer | 6.5 |
| Urea-formaldehyde resin | 0.7 |
| Methyl ethyl ketone | 46.7 |
| Methyl isobutyl ketone | 46.1 |

Example J

| | Percent by weight |
|---|---|
| 80% methyl methacrylate-20% ethyl acrylate copolymer | 6.5 |
| Urea-formaldehyde resin | 0.7 |
| Methyl isobutyl ketone | 68.8 |
| Ethyl amyl ketone | 24.0 |

Example K

| | Percent by weight |
|---|---|
| 80% methyl methacrylate-20% ethyl acrylate copolymer | 3.4 |
| Urea-formaldehyde resin | 0.4 |
| Methyl isobutyl ketone | 96.2 |

Example L

| | Percent by weight |
|---|---|
| 80% methyl methacrylate-20% ethyl acrylate copolymer | 6.5 |
| Urea-formaldehyde resin | 0.7 |
| Methyl isobutyl ketone | 73.8 |
| Methyl ethyl ketone | 19.0 |

When applying the above compositions to obtain the lens effect top coating, an air spray gun is used and the air to fluid ratio is closely controlled to yield about 1.2–1.3 cu. ft of air/sq. ft. of sign surface with about 0.6–0.8 oz. of fluid per sq. ft. of sign surface. The temperature and humidity conditions are controlled during spraying so that the tempreature is not less than about 70° F. and not greater than about 95° F., whereas the humidity must be over 20% relative humidity for these spraying conditions.

In a specific example, the composition of Example F was utilized. The composition was sprayed at a rate of 6.5 oz./min. using air at pressure of 35# at the rate of 12 cu. ft./min. from a Binks 21 spray gun having an opening of 0.028″ diameter at the nozzle. The nozzle tip was mounted about 9″ above the surface of the sign to be sprayed. The sign was located on a conveyor moving forward at a speed of about 42″/min. The nozzle traversed over this sign at a speed of 26 cycles/min.

The sign sprayed with this top coating can be an exposed lens type sign with or without a thin coating of a transparent colored material silk screened thereon to define a message.

After applying the top coat, the sign is dried in an infra red type oven at about 350°F. for about 8 minutes. The heat causes the coating to form a smooth surface.

The resulting sign was found to have excellent retro reflectivity at night and an extremely good daylight appearance.

What is claimed is:

1. A method of applying a transparent top coating onto the surface of a partially exposed glass sphere marker to obtain a coating on each sphere that is thicker at the center of the exposed portion of the sphere than at the sides thereof which comprises air spraying a transparent resin composition onto the surface of said marker, said composition comprising 0.25–20% by weight of resin in combination with 80–99.75% by weight of a solvent having an effective relative evaporation rate of at least 145 based on the evaporation rate of butyl acetate being 100, said air spraying being conducted at a relatively high air to fluid ratio so that the major portion of the solvent evaporates before the composition reaches the marker surface and there is practically no flow of the composition after it reaches the marker surface, and drying the top coating by heating.

2. A method according to claim 1 wherein the solvent comprises 75–100% of a solvent having a relative evaporation rate of at least 145 and 0–25% of a solvent having a relative evaporation rate of up to 70.

3. A method according to claim 1 further including the step of applying a coating of a transparent resin composition onto said sign blank and drying thereon in such a manner that the coating accumulates in the valleys between the spheres without coating the exposed portion of said spheres, said step being applied before the application of said transparent top coating.

4. A method according to claim 1 further including the step of applying a layer of a transparent colored resin composition onto at least a portion of said sign blank and drying thereon in such a manner that a uniform thickness dried coating of about 0.3 mil is obtained, said step being applied before the application of said transparent top coating.

5. A method according to claim 4 further including the step of applying a coating of a transparent resin composition onto said sign blank and drying thereon in such a manner that the coating accumulates in the valleys between the spheres without coating the exposed portion of said spheres, said step being applied before the colored resin composition is applied.

References Cited

UNITED STATES PATENTS

| | | | |
|---|---|---|---|
| 1,902,440 | 1/1932 | Gill | 40—135 X |
| 2,407,680 | 8/1946 | Palmquist et al. | 40—135 X |

FOREIGN PATENTS 719,817  10/1965  Canada.

ALFRED L. LEAVITT, Primary Examiner

M. F. ESPOSITO, Assistant Examiner

U.S. Cl. X.R.

40—135; 117—38, 71, 72, 104, 151; 350—105